(12) United States Patent
Le Nevé et al.

(10) Patent No.: US 9,579,692 B2
(45) Date of Patent: Feb. 28, 2017

(54) SYSTEM FOR ELIMINATING RESIDUE FROM A FLOW OF HARVEST

(75) Inventors: Daniel H. A. M. Le Nevé, Challans (FR); Vincent Rico, La Roche-sur-Yon (FR)

(73) Assignee: CNH Industrial America LLC, New Holland, PA (US)

( * ) Notice: Subject to any disclaimer, the term of this patent is extended or adjusted under 35 U.S.C. 154(b) by 129 days.

(21) Appl. No.: 14/119,393

(22) PCT Filed: May 4, 2012

(86) PCT No.: PCT/EP2012/058319
§ 371 (c)(1),
(2), (4) Date: Mar. 13, 2014

(87) PCT Pub. No.: WO2012/150355
PCT Pub. Date: Nov. 8, 2012

(65) Prior Publication Data
US 2014/0221060 A1    Aug. 7, 2014

(30) Foreign Application Priority Data
May 5, 2011  (FR) ..................... 11 53860

(51) Int. Cl.
*A01D 45/00* (2006.01)
*A01D 46/00* (2006.01)
*B02B 3/14* (2006.01)
*B07B 4/08* (2006.01)
*A01D 46/28* (2006.01)
*A23N 15/02* (2006.01)

(52) U.S. Cl.
CPC .............. *B07B 4/08* (2013.01); *A01D 46/285* (2013.01); *A23L 19/03* (2016.08); *A23N 15/02* (2013.01)

(58) Field of Classification Search
CPC .... A01D 51/002; A01D 29/00; A01D 45/006; A01D 46/285; B02C 13/284
USPC ........ 56/328.1, 14.6, 16.5, DIG. 8; 209/135, 209/142, 137, 139.1; 460/115, 128, 143, 460/100; 99/585, 640; 171/17
See application file for complete search history.

(56) References Cited

U.S. PATENT DOCUMENTS

| | | | | |
|---|---|---|---|---|
| 833,700 A | * | 10/1906 | Still ........................ | A01F 12/44 209/314 |
| 1,378,275 A | * | 5/1921 | Rademacher ................. | 56/328.1 |
| 1,509,403 A | * | 9/1924 | Howard et al. ................ | 56/14.6 |
| 1,752,375 A | * | 4/1930 | Dykes ........................... | 460/128 |
| 1,908,966 A | * | 5/1933 | Falkiner ................. | A01D 75/18 56/10.3 |
| 1,935,803 A | * | 11/1933 | Lilliston ...................... | 460/128 |

(Continued)

FOREIGN PATENT DOCUMENTS

| AU | 483698 B2 | 11/1974 | |
|---|---|---|---|
| CN | 103720009 A | * 4/2014 | ............... A23N 5/00 |

(Continued)

*Primary Examiner* — Árpád Fábián-Kovács
(74) *Attorney, Agent, or Firm* — Patrick M. Sheldrake

(57) ABSTRACT

A system for eliminating residue from a flow of harvest containing fruit, includes a motorized conveyor for feeding the flow of harvest towards an inclined surface that is arranged to allow the flow of harvest to travel over it, the surface including air passages. The system further has a blower for blowing air through the passages in order to eject residue from the flow of harvest as it is routed over the surface.

12 Claims, 3 Drawing Sheets

(56) References Cited

U.S. PATENT DOCUMENTS

| | | | | |
|---|---|---|---|---|
| 2,143,020 A * | 1/1939 | Markley et al. | | 99/628 |
| 2,226,009 A * | 12/1940 | Miller | | 209/632 |
| 2,931,500 A * | 4/1960 | Ridderstrom | | B07B 4/08 |
| | | | | 209/138 |
| 2,974,467 A * | 3/1961 | Long | | A01D 45/24 |
| | | | | 384/536 |
| 3,007,475 A * | 11/1961 | Long | | A01D 29/00 |
| | | | | 460/128 |
| 3,097,161 A * | 7/1963 | Dudyak | | 209/44.2 |
| 3,285,306 A * | 11/1966 | Wetzel | | A01D 33/02 |
| | | | | 171/17 |
| 3,429,438 A * | 2/1969 | Strandlund | | A01D 33/08 |
| | | | | 209/137 |
| 3,519,049 A * | 7/1970 | Tomelleri | | 99/640 |
| 3,591,948 A * | 7/1971 | Brumbaugh et al. | | 56/328.1 |
| 3,630,011 A * | 12/1971 | Dunn | | A01D 45/30 |
| | | | | 460/100 |
| 3,680,618 A * | 8/1972 | Pertics | | 99/516 |
| 3,747,514 A * | 7/1973 | Ireland | | 99/640 |
| 3,747,515 A * | 7/1973 | Pertics | | 99/640 |
| 3,769,988 A * | 11/1973 | Burenga | | A01D 45/24 |
| | | | | 414/502 |
| 3,775,953 A * | 12/1973 | Poutsma | | 56/126 |
| 3,804,250 A * | 4/1974 | Dankesreiter | | 209/475 |
| 4,014,390 A * | 3/1977 | Teixeira | | A01D 17/10 |
| | | | | 171/124 |
| 4,191,294 A | 3/1980 | McGrath, Jr. et al. | | |
| 4,262,477 A * | 4/1981 | Turold et al. | | 56/327.1 |
| 4,364,222 A * | 12/1982 | Ramacher | | A01D 51/002 |
| | | | | 209/139.1 |
| 4,509,414 A * | 4/1985 | Chiu et al. | | 99/585 |
| 4,565,326 A * | 1/1986 | Varley | | 241/19 |
| 4,642,977 A * | 2/1987 | Ramacher | | A01D 51/00 |
| | | | | 56/16.5 |
| 4,730,444 A * | 3/1988 | Leffel | | A01D 45/30 |
| | | | | 56/12.9 |
| 4,753,296 A * | 6/1988 | Kruithoff | | A01D 17/10 |
| | | | | 171/17 |
| 4,959,038 A * | 9/1990 | Ragsdale | | D01B 1/14 |
| | | | | 460/100 |
| 5,001,893 A * | 3/1991 | Stanley | | A01D 51/002 |
| | | | | 56/16.5 |
| 5,024,278 A * | 6/1991 | Shuknecht | | A01D 23/04 |
| | | | | 171/17 |
| 5,148,921 A * | 9/1992 | White | | 209/20 |
| 5,197,549 A * | 3/1993 | Shuff | | 171/17 |
| 5,203,259 A * | 4/1993 | Miedema | | 99/640 |
| 5,339,961 A * | 8/1994 | Mayhak | | B03B 9/06 |
| | | | | 209/244 |
| 5,376,046 A * | 12/1994 | Shuknecht et al. | | 460/99 |
| 5,431,000 A * | 7/1995 | Shuknecht | | A01D 34/20 |
| | | | | 460/143 |
| 5,624,315 A * | 4/1997 | Jonckheere | | A01F 12/444 |
| | | | | 460/100 |
| RE35,917 E * | 10/1998 | Fischer | | A01D 45/28 |
| | | | | 56/12.9 |
| 6,547,661 B1 | 4/2003 | Ferrandez | | |
| 7,007,449 B2 * | 3/2006 | Kido et al. | | 56/327.1 |
| 7,322,424 B2 * | 1/2008 | Kido | | B07B 4/02 |
| | | | | 171/17 |
| 7,410,454 B1 * | 8/2008 | Levine | | B31D 5/006 |
| | | | | 493/342 |
| 7,966,796 B2 * | 6/2011 | Leach et al. | | 56/327.1 |
| 8,216,035 B2 | 7/2012 | Ravineau et al. | | |
| 8,251,788 B2 * | 8/2012 | Stukenholtz | | A01F 12/44 |
| | | | | 460/79 |
| 8,642,910 B2 * | 2/2014 | Pellenc | | A01D 46/285 |
| | | | | 209/538 |
| 2002/0004418 A1 * | 1/2002 | Mesquita et al. | | 460/115 |
| 2005/0229576 A1 * | 10/2005 | Flora et al. | | 56/328.1 |
| 2007/0000224 A1 * | 1/2007 | Meester | | 56/327.1 |
| 2007/0066368 A1 * | 3/2007 | Flora et al. | | 460/79 |
| 2009/0056297 A1 * | 3/2009 | Pellenc et al. | | 56/330 |
| 2009/0057208 A1 * | 3/2009 | Pellenc et al. | | 209/606 |
| 2010/0000194 A1 * | 1/2010 | Meester | | 56/327.1 |
| 2010/0096301 A1 * | 4/2010 | Nyborg et al. | | 209/667 |
| 2011/0112684 A1 * | 5/2011 | Pellenc | | 700/223 |
| 2012/0110971 A1 * | 5/2012 | Monchiero et al. | | 56/328.1 |
| 2014/0144118 A1 * | 5/2014 | Le Neve et al. | | 56/328.1 |

FOREIGN PATENT DOCUMENTS

| | | |
|---|---|---|
| FR | 2298266 A1 | 8/1976 |
| FR | 2686530 A1 | 7/1993 |
| FR | 2878172 A1 | 5/2006 |
| FR | 2940005 A1 | 6/2010 |
| WO | 2009065176 A1 | 5/2009 |

* cited by examiner

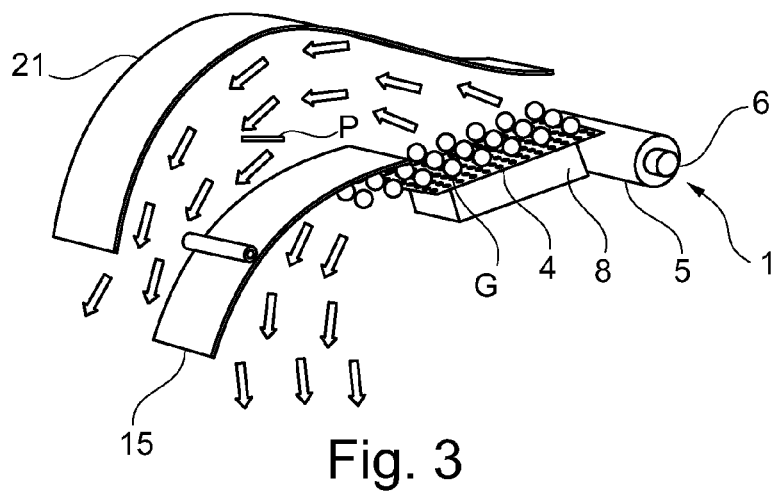
Fig. 3
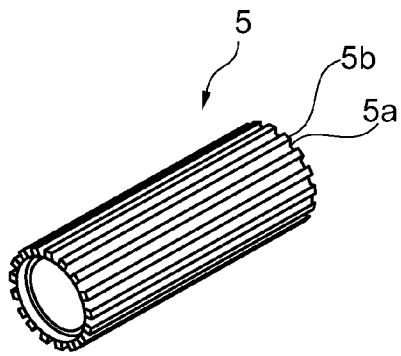
Fig. 4
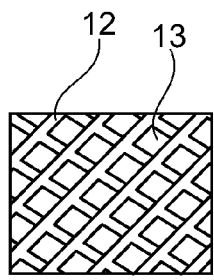 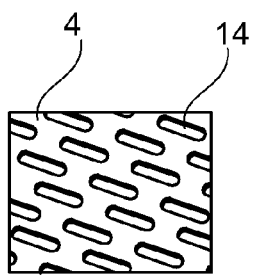 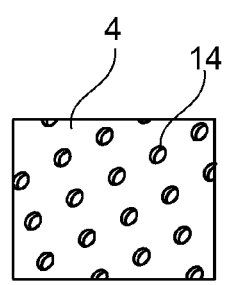
Fig. 5a  Fig. 5b  Fig. 5c

US 9,579,692 B2

SYSTEM FOR ELIMINATING RESIDUE FROM A FLOW OF HARVEST

This application is the US National Stage filing of International Application Serial No. PCT/EP2012/058319 filed on May 4, 2012 which claims priority to French Application 1153860 filed May 5, 2011, each of which is incorporated herein by reference in its entirety.

FIELD OF THE INVENTION

The invention relates to a method of eliminating residue from a flow of harvest containing fruit, a residue elimination system for implementing such a method, a cleaning assembly including such an elimination system, and a fruit harvesting machine including such a cleaning assembly or such an elimination system.

The invention applies to the field of the mechanised harvesting of fruit growing on trees or bushes, such as grapes, berries, coffee beans, olives and other fruits notably growing in bunches.

BACKGROUND OF THE INVENTION

Such fruit is conventionally harvested by a shaker system that straddles a row of plants to detach the harvest. The flow of harvest obtained is then conveyed in the machine to be stored in at least one hopper provided for this purpose or in an ancillary trailer.

However, because of the action of shaker system, the flow of harvest includes, in addition to the detached fruit, notably juice, leaves, stalks, particles of wood, bunches of fruit of varied sizes.

To eliminate components other than fruit, in particular leaves and pieces of wood, harvesting machines include a cleaning device that is provided to eliminate said components from the flow by suction before storage.

Moreover, the search for quality in the field of vinification requires the elimination of green residue, notably leaf stalks, contained in the flow of harvest. However, the prior art does not satisfactorily enable such elimination in the harvesting machine.

The document FR-2 878 172 describes a system for eliminating residue from a flow of harvested grapes, said system including a sorting enclosure from which a layer of grapes and residue falls vertically, means for creating an air blade across said layer to redirect the lighter residue along a trajectory deflected relative to the trajectory along which the grapes fall, and separation means disposed downstream of the means for creating an air blade in order to separate the deflected trajectories of the residue and the falling grapes.

This system is not entirely satisfactory, however, in that a substantial part of the residue may not be deflected. The air blade is characterised by a large width and a very small height. Consequently, elongate elements such as leaf stalks that have assumed a vertical position on passing in front of said air blade are not deflected relative to the other elements. Moreover, during this passage, the layer of harvest is in free fall. The speed of the product is therefore too high relative to the height of the blade to enable satisfactory deflection of the residue. Finally, the relative position of the falling elements may lead to a leaf stalk being masked by surrounding grapes with the result that the air blade is unable to separate them.

SUMMARY OF THE INVENTION

The invention aims to improve on the prior art notably by proposing a method and a system for eliminating residue from a flow of harvest that enable the quality of said harvest to be significantly improved.

To this end, and according to a first aspect, the invention proposes a method of eliminating residue from a flow of harvest containing fruit, said method comprising:
  feeding a flow of harvest to an inclined surface that is arranged to allow said flow of harvest to travel over it, said surface including an array of air passages; and
  blowing air through said passages in order to eject residue from the flow of harvest as it is routed over said surface.

According to a second aspect the invention proposes a system for eliminating residue from a flow of harvest by using such a method, said system including:
  a motorised conveyor for moving the flow of harvest in a longitudinal conveying direction between upstream and downstream transverse shafts;
  a separator device including a surface disposed in continuity with the conveyor in order to be fed with the flow of harvest by said conveyor, said surface being inclined to enable the flow of harvest to be routed over said surface, said surface further including an array of air passages in communication with blower means for ejecting residue from the flow of harvest as it is routed over said surface.

According to a third aspect, the invention proposes a cleaning assembly for a flow of harvest including such a residue elimination system and a destemming device including a screen that is motorised in a longitudinal direction between an upstream transverse shaft and a downstream transverse shaft, said screen including openings adapted to allow the fruit to pass through, said destemming device further including means adapted to interact with the flow of harvest disposed on a downstream portion of the screen in order to bring about the separation of fruit attached to the bunch stems, the conveyor being disposed below an upstream portion of said screen and the machine further including a conveyor for feeding the flow of harvest onto said upstream portion.

According to a fourth aspect, the invention proposes a fruit harvesting machine including a motorised support structure and a harvesting assembly mounted on said structure, said harvesting assembly being adapted to detach the harvest, said machine including such a residue elimination system or such a cleaning assembly that is fed with the flow of harvest from the harvesting assembly.

BRIEF DESCRIPTION OF THE DRAWINGS

Other objects and advantages of the invention will become apparent in the course of the following description, given with reference to the appended figures, in which:

FIG. 3 shows diagrammatically the operation of a residue elimination system of the invention;

FIG. 4 represents diagrammatically in perspective a roller of a conveyor equipping a leaf stalk elimination system of the embodiments of FIGS. 1 and 2;

FIGS. 5a-5c represent diagrammatically the surface of a separator device showing the air passages in a respective embodiment of the invention;

DETAILED DESCRIPTION OF PREFERRED EMBODIMENTS

Figure 1:
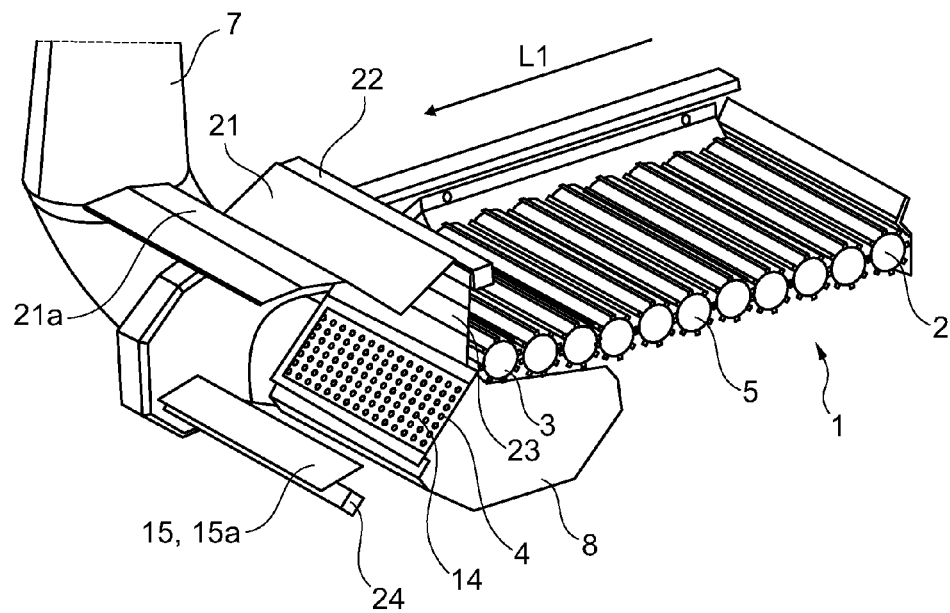
FIGS. 1 and 2 represent diagrammatically in longitudinal section a residue elimination system of a respective embodiment of the invention.

The invention is applicable to a machine for harvesting fruit, in particular a harvester for the mechanised harvesting of grapes, notably with a view to their subsequent vinification. A harvester conventionally includes a motorised support structure that is equipped with a driver station and a harvesting assembly mounted on said structure.

The harvester is designed to straddle at least one row of vines so that, as it moves, the vines are introduced successively into the harvesting assembly, which is adapted to detach the harvest. To this end, the harvesting assembly includes vine shakers, notably a row of shakers on each side of the space into which the vines are introduced.

The harvester also includes a system for continuous recovery of the detached harvest that includes, in addition to the detached grapes G, notably leaf stalks P, juice, leaves, pieces of wood, bunches of varied sizes. In one embodiment, the system includes two bucket conveyors adapted to recover the detached harvest below the introduction space and to convey said harvest into the upper portion of the harvester in order to be able to store said harvest in at least one hopper.

In the context of vinification of grapes, it is desirable to eliminate the residue contained in the flow of harvest, notably green residue such as large and small stalks P, leaves, branches and pieces of wood in order for said harvest to be stored substantially free of said residue.

There is described hereinafter a residue elimination system for doing this that is notably intended to be mounted in the machine in order to be fed with the flow of harvest from the harvesting assembly. The elimination system may be fed directly with the flow from the harvesting assembly. Alternatively, the elimination system may be fed via a cleaning device and/or a sorting device. In particular, if the flow of harvest is a flow of grapes, the elimination system may further be fed by a destemming device enabling separation of the grapes G attached to the bunch stems.

In another embodiment, the elimination system may be installed at a stationary station in order to eliminate residue from a flow previously harvested, notably by a harvesting machine, and then stored.

The residue elimination system includes a motorised conveyor 1 for moving the flow of harvest in a longitudinal conveying direction L1 between upstream and downstream transverse shafts 2 and 3, respectively, and a separator device including a support having a surface 4 disposed in continuity with said conveyor in order to be fed with the flow of harvest by said conveyor.

Referring to the figures, the conveyor 1 includes a plurality of rollers 5 spaced longitudinally, said rollers being driven in rotation to move the flow of harvest on said rollers in a longitudinal direction L1.

Given that they are brought into contact with the flow of harvest, the rollers 5 are preferably made from a corrosion-resistant material, notably a stainless metal or a synthetic material. Moreover, the rollers 5 have a geometry of revolution which, when they rotate, causes longitudinal movement of the flow of harvest with limited mechanical loads exerted on the fruit.

Each roller 5 is fixedly mounted on a bar 6 (FIG. 3) driven in rotation, said roller including a bore the geometry of which is complementary to that of said bar in order to assure the circumferential fixing of said roller to said bar. In particular, the bars 6 have a polygonal section and each of the rollers 5 includes a bore of complementary section.

For optimum elimination of residue, the separator system must be fed as homogeneously as possible by the conveyor 1 and with the best possible distribution. To this end, each of the rollers 5 has a surface of revolution including grooves 5a that extend transversely and continuously over its entire length (FIG. 4).

In the embodiment shown, each of the rollers 5 includes a plurality of grooves 5a each of which has a U-shaped section and which are separated in the circumferential direction by axial ribs 5b, each of said ribs extending transversely and continuously over the entire length of said roller and having an inverted U-shaped section. The shape and the arrangement of the grooves and ribs between two adjacent rollers are such as not to degrade the grapes G transferred by the rollers 5.

Such a circumferential distribution of the grooves 5a and the ribs 5b enables longitudinal movement in the direction L1 of the flow of harvest. Causing the lower layer of the transferred product to move allows the grapes G to migrate laterally and to occupy the entire width of the conveyor 1. The distribution of the flow on the conveyor 1 is therefore the optimum. Thus the conveyor 1 feeds the separator device with a flow of harvest having a limited thickness, which enables improvement in the elimination of residue effected by said separator device. The speed of the conveyor 1 may be modulated as a function of the quantity of product transferred, enabling this limited thickness to be preserved.

In particular, the conveyor 1 is conventionally fed with the flow of harvest by forming on the rollers 5 a swath having a plurality of layers and a limited transverse dimension.

The rollers 5 enable longitudinal driving of the base of the swaths and transverse distribution of said swaths so as to obtain after only a few rollers 5 a spreading of the flow of harvest in substantially a single layer. Furthermore, the grooves 5a enable evacuation of juice, pulp and small elements such as pips to assure presorting of the flow of harvest.

Figure 2:
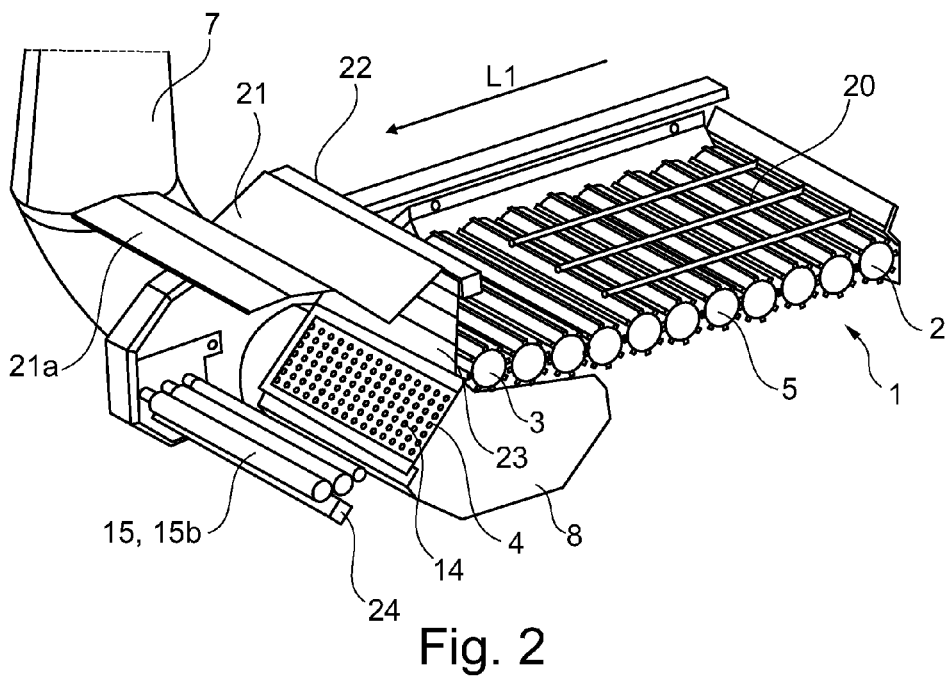

In an embodiment that is not shown, the conveyor 1 may take the form of a smooth belt or any other system adapted to move the flow of harvest. In FIG. 2, the conveyor 1 includes longitudinal rods 20 that extend over an upstream part of said conveyor, said rods being adapted to limit transverse migration of the conveyed flow of harvest in the event of transverse inclination of the conveyor 1, in particular by the inclination of the harvesting machine.

The surface 4 is inclined to allow the flow of harvest to be routed over said surface and includes air passages in communication with blower means 7 to enable the ejection of residue from the flow of harvest being routed.

In particular, referring to FIG. 3, a combination of physical characteristics enables separation of usable grape berries G and residue. The usable berries G have a substantially spherical external shape, giving them a low drag coefficient Cx. This good air penetration feature is all the greater as the external surface of a grape berry G has an extremely low roughness. Moreover, the mass of a berry G is high relative to the area of resistance that it offers to the flow of air. All these elements mean that a controlled flow of air has very little impact on the trajectory of a moving spherical grape berry G.

The residue likely to be present in the flow of product is of various kinds: large and small leaf stalks, pieces of leaf, wood, etc. None of these elements has all of the features cited in the preceding paragraph: good air penetration (Cx), element surface roughness, mass relative to the area of the element. Consequently, a flow of product composed of grape berries G and residue subjected to a flow of air over the surface 4 leads to separation of the trajectories of each component of the product. The berries G are not impacted by the flow of air, and their rotation movement as they drop onto the surface 4 is substantially unchanged. On the other hand, the residue is separated from the berries G because of the modification of their trajectory by said flow of air.

It has also been experienced that the difference in drag coefficient Cx between a healthy berry and an infected berry is sufficient to separate the one from the other. When the berry is covered or partly covered with mould, such as botrytis, the effect on the surface is such that the Cx coefficient is raised substantially. A raise in drag coefficient is equally is found in damaged or dried berries, which no longer have a good spherical shape. Also these are separated from the healthy berries.

The separator device may include a box 8 that has an upper surface 4 forming a support and an internal chamber that establishes communication between the air passages and the blower means 7.

In a different embodiment that is not shown, the conveyor may have an upstream portion over which the flow of harvest moves in a longitudinal direction L1 and an inclined downstream portion, said downstream portion including at least one roller with perforations forming air passages over its surface of revolution, and an internal chamber that establishes communication between said air passages and the blower means.

In one embodiment the surface 4 is inclined relative to the longitudinal direction L1 of the conveyor 1 at an angle in the range 30° to 60°, in particular of the order of 45°. Thus the flow of harvest is routed over the surface 4 with a speed adapted to enable ejection of the residue and does not accumulate on said surface. Moreover, the conveyor 1 may include means for regulating its speed in order for the flow of harvest to be transferred over the surface 4 at an appropriate speed for said flow of harvest to remain for a sufficiently long time on said surface.

In the embodiments shown, the elimination system includes an upper beam 22 disposed above the downstream shaft 3 of the conveyor 1, a flexible bib 23 being associated with said beam and extending just in front of said downstream shaft and over substantially the entire transverse dimension of the conveyor 1 in order to slow down the conveyed flow of harvest before it is routed over the surface 4. The flexible bib 23 imposes contact of the grapes G with the surface 4 and prevents any spraying of juice. Thus the flow of harvest is fed over the surface 4 at a low speed, said flow accelerating on the surface 4 to increase the overall routing time and thus to improve the ejection of residue.

The inclination of the surface 4 relative to the longitudinal direction L1 of the conveyor 1 may be adjusted to adapt it to the flow of harvest. Moreover, as shown in the figures, the surface 4 may be plane. In a different embodiment that is not shown, the surface 4 may be slightly domed, in particular in a parabolic manner, to limit the speed of the flow at the start of routing, and then to accelerate it in order to improve the ejection of residue. Thus the surface 4 may be adapted to the trajectory of the grapes.

The surface 4 may include a woven grill 12 through which are formed air passages 13. FIG. 5a is an enlarged representation of such a grill 12. Alternatively, the surface 4 may have an array of perforations 14 forming air passages. FIGS. 5b and 5c represent such perforations 14, respectively with an oblong geometry (FIG. 5b) and a circular geometry (FIG. 5c).

In particular, the perforations 14 may be produced by punching the surface 4 from its right side so as to form rounded edges on the surface for routing the flow of harvest, which improves the exit of air and limits blocking of the perforations 14.

The oblong holes of FIG. 5b may extend along parallel, horizontal lines and have a length to height ratio of 4 to 1 or greater.

The air passages 13, 14 enable the formation of an air cushion with a high flow of air. In particular, the passages 14 are distributed over the surface 4, on the one hand, so that the grapes G cannot block two passages 14 at a time, in order to prevent their ejection and improve their routing, and, on the other hand, so that residue with a more extensive geometry is ejected.

In particular, the passages 14 may be disposed in a quincunx arrangement and have a small longitudinal dimension, for example less than 5 mm, notably in the range 2 mm to 3 mm. Moreover, the percentage of passages 13, 14 on the surface 4 may be in the range 30% to 50%, for example of the order of 40%.

Moreover, the blower means 7 may be adapted to direct into the internal chamber of the box 8 a flow of air with a flow rate and/or a pressure sufficiently high to enable satisfactory ejection of residue. In one embodiment, the air speed may be in the range 8 m/s to 12 m/s at a distance of 25 mm from the surface 4.

Optimal operation necessitates a uniform flow of air over the entire surface 4. To obtain this uniformity of the flow, distributor means such as a deflector may be installed inside the box 8. A deflector of this kind may take the form of an optimised geometry hood of the type described in the publication FR-A-2 940 005.

To enable the separation of the respective trajectories of the residue and the grapes G, the separator device may further include a deflector 15 that is positioned downstream of the surface 4 to enable the ejection of residue along an upper trajectory and the fruit G routed over the surface 4 in a lower trajectory that is separated from said upper trajectory by said deflector.

The position of the deflector 15 relative to the surface 4 may be adjustable longitudinally and/or in elevation and/or in inclination, notably as a function of the trajectories taken by the various elements P, G of the flow of harvest because of the effect of the air cushion.

Referring to FIG. 1, the deflector 15 includes a plate 15a carried by a lower beam 24. Alternatively, the deflector 15 includes at least one rotary member disposed facing the surface 4. Referring to FIG. 2, a plurality of rollers 15b is disposed above the lower beam 24, said rollers being driven in rotation in the anti-clockwise direction to force the residue ejected onto said rollers to follow the upper trajectory.

The separator device further includes an upper deflector 21 that limits the upper trajectory of the residue, for example with a view to recovery of said residue. Moreover, the upper deflector 21 isolates the ejection area from external conditions, notably the wind.

In this embodiment, the upper deflector 21 is associated with the upper beam 22 and has a downstream area 21a that is slightly concave toward the surface 4 to encourage guidance of the air in the residue ejection upper trajectory.

Figure 6A:
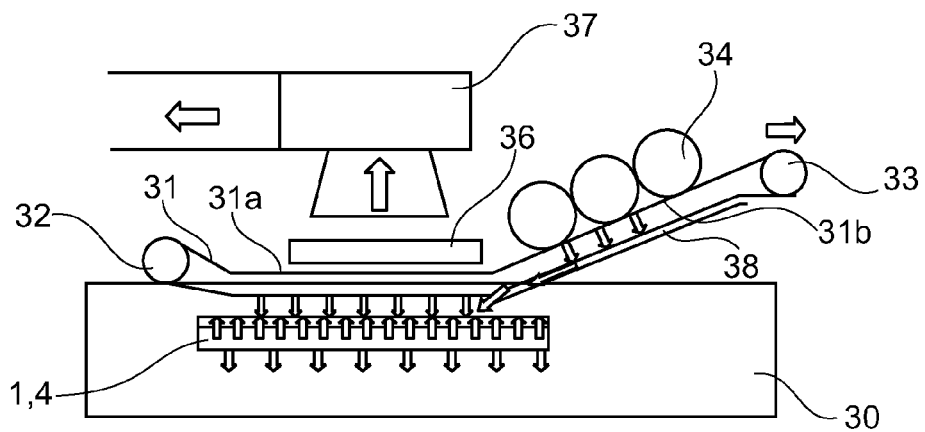
FIG. 6 represent diagrammatically the disposition of an elimination system and a destemming device above a hopper of a harvesting machine, from the side (FIG. 6a), from above (FIG. 6b), and from the front (FIG. 6c).
Figure 6B:
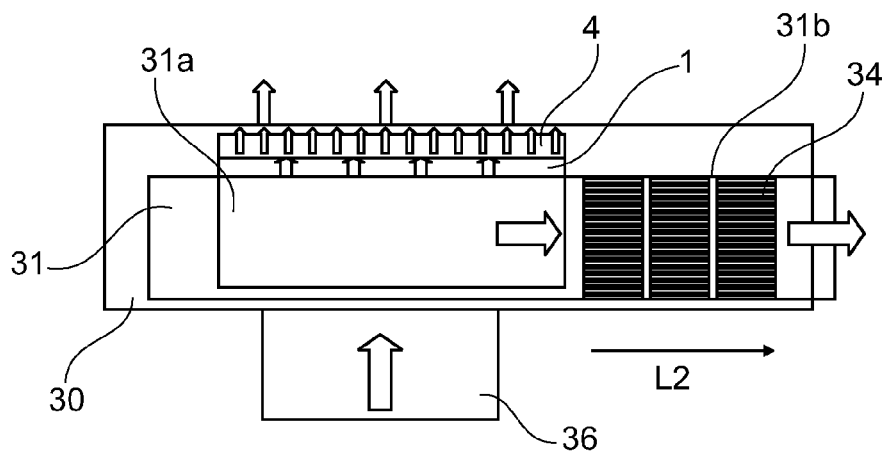
Figure 6C:
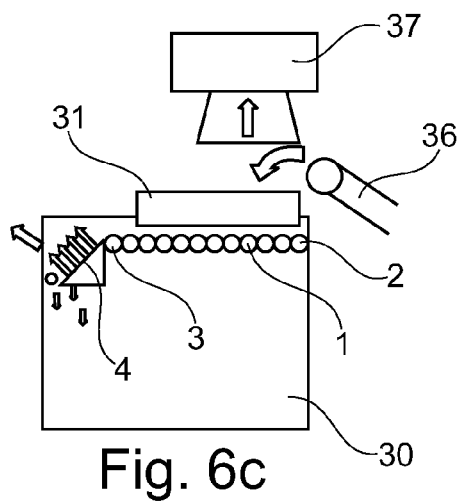

Referring to FIG. 6, there is described hereinafter a harvesting machine including a hopper 30 above which is disposed a cleaning assembly including the elimination system and a destemming device. In particular, the machine may include two hoppers 30 equipped in this way. Alternatively, the machine may be equipped with a elimination system only or the cleaning assembly may be used independently of the machine, for example in a cellar.

The destemming device includes a screen 31 that is driven in a longitudinal direction L2 between an upstream transverse shaft 32 and a downstream transverse shaft 33. The screen 31 includes openings adapted to enable fruit to pass through and means adapted to interact with the flow of harvest disposed on the screen 31 in order to bring about separation of the fruit attached to the bunch stems.

In an embodiment known from the document EP-1 002 467, for example, to enable separation of the fruit from the bunch stems by an ejection effect, the destemming device includes a motorised rotary member 34 surmounting an endless screen 31. The member 34 includes radial destemming fingers adapted, when rotating, to interact with the flow disposed on the screen 31 in order to bring about the separation of fruit attached to the stalks, which fruit may then pass through the screen 31 while the rest of the flow remains on said screen.

The screen 31 has an upstream portion 31a and a downstream portion 31b, the rotary members 34 being disposed only above said downstream portion to effect the destemming. The machine also includes a conveyor 36 for feeding the flow of harvest onto the upstream portion 31a.

In particular, the flow of harvest from the harvesting assembly is fed onto the upstream portion 31a of the screen 31, notably the free fruits of said flow passing through said upstream portion, and the remainder of the harvest is conveyed toward the downstream portion 31b to be destemmed. Moreover, beyond the downstream transverse shaft 33, stalks and other residue disposed on the screen 31 is ejected outside the hopper 30.

Moreover, the machine includes a device 37 for cleaning by suction the flow of harvest feeding the upstream portion 31a of the screen 31, said device being disposed above the conveyor 36, notably to suck up leaves, branches and pieces of wood from said flow.

The conveyor 1 is disposed below the upstream portion 31a of the screen 31 so as to be fed with the flow of harvest passing across said upstream portion, said flow then being conveyed toward the separator device 2, notably to eliminate leaf stalks that may have been able to pass across the upstream portion 31a of the screen 31.

In particular, the surface 4 is disposed above the hopper 30 to enable its direct filling with the grapes, the surface 4 being disposed to allow ejection of residue outside said hopper.

In the embodiment shown, the longitudinal direction L1 of the conveyor 1 is perpendicular to the longitudinal direction L2 of the screen 31. Moreover, the hopper 30 includes a top opening having a longitudinal dimension that is greater than its transverse dimension, said longitudinal dimension being that in the direction of forward movement of the machine and in the longitudinal direction L2 of the screen 31.

To improve sorting further, the destemming device further includes means for feeding the conveyor 1 with the destemmed flow of harvest. Thus even the destemmed flow is sorted before it is stored, notably to eliminate leaf stalks that may have been able to pass over the screen 31 during destemming.

In one embodiment, the feed means include a deflector 38 disposed under the downstream portion 31b of the screen 31, said deflector forming a feed path of the conveyor 1. In particular, the downstream portion 31b and the deflector 38 are inclined to enable the conveyor 1 to be fed by gravity.

In an alternative embodiment of the invention, not show in the Figures, the destemming device is shortened by arranging the upstream axis 32 at a position upstream of the conveyor 36. A conveying and sorting device is provided in the space freed by the shortened upstream portion 31a of the screen. The conveying and sorting device is arranged below the outlet of the conveyor 36 and below the hood of the cleaning device 37 and may comprise a succession of substantially cylindrical conveyor rollers and separator rollers having passages between them. The rollers are operable to convey the harvest to the destemming device. The cylindrical rollers may be of the same type as the rollers 5 of conveyor 1. The separator rollers may comprises disks between which the grape berries can pass. The last roller is aligned with the new upstream portion of the screen 31 of the destemming device.

In use, the conveyor 36 supplies the harvest to the cylindrical rollers, which spread out the berries and other material and convey them to the separator rollers. Loose berries, juice, small particles and leaf stalks are permitted to fall through the openings 10 of the separator system 2 and the greater harvest material is fed towards the destemming device. The last separator roller, which is disposed adjacent the shorter moving screen 31, transfers the bunches and other material onto this screen, which guides them to the rotary members 34 for removal of the berries from the stems. The loosened berries migrate through the upper and lower runs of the screen 31 and the deflector 38 guides them back to the hopper 30. The bunch stalks and other residue are ejected from the machine at the downstream axis 33.

The cleaning device 37 extracts lighter and greater surface portions such as leaves from the harvest while they fall from the conveyor 36 to the sorting device and are conveyed along the sorting device. The rotating rollers 3, 12 shake the material and dislodge any material that might hold the leaves down. This extraction further is enhanced while the material passes below the hood and over the openings 10, which allow for a substantial upward air flow.

The invention claimed is:

1. A fruit harvester for harvesting fruit grown on trees or bushes, comprising:
   a hopper for receiving harvested fruit;
   a residue system comprising:
      a motorised conveyor comprising upstream and downstream transverse shafts wherein the shafts are motorized to have longitudinal conveying direction for moving the flow of harvest;
      a separator device including a surface disposed in flow continuity following the conveyor in order to be fed with the flow of harvest by said conveyor, said surface inclined downward between the downstream shaft and an inlet to the hopper, such that the flow of harvest is routed over said surface, said surface further including an array of air passages therein in communication with a blower such that passages are configured to project jets of air to eject residue from the flow of harvest as it is routed over said surface.

2. A fruit harvester according to claim 1, further comprising a deflector positioned downstream of the surface above the inlet to the hopper and below the downstream shaft to enable the ejection of residue along an upper trajectory and the fruit routed over the surface in a lower trajectory to the hopper that is separated from said upper trajectory by said deflector.

3. A fruit harvester according to claim 2, wherein the deflector includes at least one rotary member disposed facing the surface.

4. A fruit harvester according to claim 2, wherein the separator device also includes an upper deflector having a deflecting portion above the downstream shaft that limits the upper trajectory of the residue.

5. A fruit harvester according to claim 1, further comprising a flexible bib extending adjacent said downstream shaft and over substantially the entire transverse dimension of the conveyor in order to slow down the conveyed flow of harvest before it is routed over the surface.

6. A fruit harvester according to claim 1, wherein, wherein said upstream and downstream shafts for part of a series of adjacent longitudinally-spaced rollers, said rollers driven in rotation to move the flow of harvest over said rollers.

7. A fruit harvester according to claim 6, wherein each of the rollers has a surface of revolution that includes axial grooves extending from the surface of revolution and that extend continuously across the fruit contacting length of each roller length, wherein said series of rollers are positioned adjacent one another such that fruit is transported from one of axial grooves of one of the series of rollers to one of the axial grooves of the next adjacent one of the series of rollers.

8. A fruit harvester according to claim 1, wherein the surface is inclined relative to the longitudinal direction of the conveyor at an angle in the range of 30° to 60°.

9. A fruit harvester according to claim 1, wherein the separator device comprises a box that has an upper surface forming a support and an internal chamber that establishes communication between the air passages and the blower.

10. A fruit harvester according to claim 1, wherein the surface has an array of perforations forming the air passages.

11. A fruit harvester according to claim 1, wherein the surface includes a woven grill through which are formed air passages.

12. A system for eliminating residue according to claim 1, wherein the conveyor is located below an end of a harvest supply conveyer of the fruit harvester and configured to receive fruit from the supply conveyer, wherein the harvest supply conveyer is positioned below a suction cleaning device of the harvester.

* * * * *